United States Patent
Pauchon et al.

[11] Patent Number: 5,550,761
[45] Date of Patent: Aug. 27, 1996

[54] METHOD FOR MODELLING MULTIPHASE FLOWS IN PIPELINES

[75] Inventors: Christian Pauchon, St Germain-En-Laye; Gilles Ferschneider, St Symphorien D'Ozon; Daniel Ferre, Sautron, all of France

[73] Assignees: Institut Francais du Petrole, Rueil Malmaison, France; Total, Puteaux, France; Elf Aquitaine, Courbevoie, France

[21] Appl. No.: 193,457

[22] Filed: Feb. 8, 1994

[51] Int. Cl.$^6$ .................................................. G01F 22/00
[52] U.S. Cl. ...................... 364/578; 73/861.04; 73/61.44
[58] Field of Search ..................................... 364/476, 803, 364/578, 510, 496; 73/861.04, 61.44; 166/250

[56] References Cited

U.S. PATENT DOCUMENTS

| | | | |
|---|---|---|---|
| 4,534,003 | 8/1995 | Manzione | 364/476 |
| 4,559,610 | 12/1985 | Sparks et al. | 364/803 |
| 4,683,759 | 8/1987 | Skarsvaag et al. | 73/861.04 |
| 4,875,178 | 10/1989 | Cook | 364/578 |
| 5,031,108 | 7/1991 | Fujita et al. | 364/476 |
| 5,031,127 | 7/1991 | Fujita et al. | 364/476 |
| 5,051,922 | 9/1991 | Toral et al. | 364/510 |
| 5,072,404 | 12/1991 | Schmitzer et al. | 364/510 |
| 5,095,983 | 3/1992 | Magnani | 166/250 |
| 5,099,697 | 3/1992 | Agar | 73/861.04 |
| 5,255,212 | 10/1993 | Kondoh et al. | 364/578 |
| 5,287,752 | 2/1994 | Den Boer | 73/861.04 |
| 5,315,530 | 5/1994 | Gerhardt et al. | 364/510 |
| 5,414,641 | 5/1995 | Shinoaki et al. | 364/510 |

Primary Examiner—Kevin J. Teska
Assistant Examiner—Russell W. Frejd
Attorney, Agent, or Firm—Antonelli, Terry, Stout & Kraus

[57] ABSTRACT

A unified hydraulic model has been developed by the method according to the invention which is applicable to any slope and diameter of pipeline and can handle most of the steady state as well as transient multiphase flow regimes encountered in practice. The new modelling method differentiates two types of flow patterns: separated flow patterns (stratified or annular) and dispersed flow patterns. Intermittent flow patterns (slug, churn flow) are a combination of these two patterns. The same concept has been successfully applied for transition criteria between different flow regimes, insuring continuity of the solutions across the transitions. This requirement is very important for simulating transient phenomena. The transient resolution is achieved by an explicit time advancing scheme. The advantages of the method are; its ability to follow wave front propagation, an easy implementation for the resolution of complex pipeline networks. The performance of the resulting unified hydraulic model is demonstrated using a large number of experimental data.

8 Claims, 5 Drawing Sheets

FIG.1

Transition Algorithm

METHOD FOR MODELLING MULTIPHASE FLOWS IN PIPELINES

BACKGROUND OF THE INVENTION

1. Field of the Invention

The invention relates to a method for modelling steady state as well as transient multiphase flows such as hydrocarbon mixtures circulating in pipeline networks taking into account a set of variables defining fluid properties and flow patterns, as well as dimensions or slope angles of the pipelines.

2. Description of the Prior Art

Prior art relating to multi-phase

Fabre, J., et al 1983. Intermittent gas-liquid flow in horizontal or slightly inclined pipes, *Int. Conference on the Physical Modelling of Multi-Phase Flow*, Coventry, England, pp 233, 254

Fabre, J., et al 1989. Two fluid/two flow pattern model for transient gas liquid flow in pipes, *Int. Conference on Multi-Phase Flow*, Nice, France, pp 269, 284, Cranfield, BHRA.

SUMMARY OF THE INVENTION

The method according to the invention includes numerical resolution of a drift-flux type model applied to any situation encountered in multiphase production. The state of a multiphase flow is determined by solving a set of four conservation or transport equations. Two equations relate to the mass of each phase in a mixture, a second one, to the mixture momentum and a third one, for the mixture energy. The missing information about the slip between phases is restored by a steady state closure model depending on the flow regime.

In view of identifying the flow regimes, it is considered that each of them is a space vs time combination of two basic patterns: separated flow i.e flows stratified in a vertical direction or flows radially separated in a pipeline, and dispersed flows. Any intermediate or intermittent flow corresponding to liquid or gas slugs is then considered as a combination of the two basic patterns and is characterized by a parameter $\beta$ representing the fraction of separated flow which insures continuity of some closure relations.

To represent closely the actual flowing of hydrocarbons in pipelines it is neccessary to build a model which is continuous across flow regime transitions and also to select a limited set of closure relations well qualified against experimental results and continuous with respect to pipe slope and fluid properties.

The method according to the invention is used for modelling steady state and transient multiphase flows of fluids such as hydrocarbon mixtures circulating in pipelines taking into account a set of variables defining fluid properties and flow patterns and also dimensions or slope angles of the pipelines, by numerical resolution of a drift-flux type model, comprising solving a set of transport equations including mass conservation equations for each phase, a mixture momentum equation and a mixture energy equation, and closure relations suitable for dispersed flow regimes, a separated flow regime and any intermediate intermittent flow regime with formation of liquid or gas slugs, said method also comprising:

characterizing flow regimes by a parameter $\beta$ representing the fraction of a flow in a separated state, said parameter $\beta$ continuously ranging from 0 for dispersed flow regimes and 1 for separated flow regimes;

determining any current flow regime while determining said set of transport equations by comparing current values of a liquid fraction in slugs with respect to a liquid fraction in a dispersed region of the flow, as well as gas slug velocity with respect to a critical velocity; and imposing while solving said closure relations continuity constraints at the boundaries between said regimes to the respective gas volume fractions and to the slug velocities.

The method can be carried out for example by imposing as an upper limit for the volume fraction of gas in the dispersed region of a flow, the gas volume fraction, and having the slug velocity continuously tend to the gas velocity in the slugs as said volume fraction of gas reaches said upper limit, thereby smoothing transitions at the dispersed/intermittent boundary.

The method can include using a explicit time advancing scheme.

The method according to the invention allows building a model provided with closure relations better accounting for transitions between intermediate intermittent flow regimes and the two basic patterns. It also offers a faster way to reach sought solutions by a better arrangment of the different intermediate steps. An early accounting for values of some parameters allows for determination of the true flow regime and thus avoids useless computing steps which are otherwise all achieved when tests relating to the values of such parameters are as usual effected afterwards.

BRIEF DESCRIPTION OF THE DRAWINGS

Other features and advantages of the method according to the invention will be clear from reading the description hereafter of embodiments given by way of non limitative examples, with reference to the accompanying drawings in which.

DESCRIPTION OF THE PREFERRED EMBODIMENTS

The method for modelling liquid/gas flow of fluids in pipelines includes solving a set of transport and closure equations while giving particular attention to providing realistic smooth solutions for flow regime transitions. The method is based upon:

a selection of a set of transport equations which insures a good representation of the properties of the fluid progressing along pipes, the choice of a limited set of closure relations well qualified against experimental results and which has been made continuous with respect to slope and fluid properties, and the concept of flow pattern transitions based on the continuity of the calculated variables.

The set of transport equations includes one mass conservation equation for each of the phases (Equations. 1 & 2), one mixture momentum equation (Equation 3) and one mixture energy equation (Equation.4).

$$\frac{\partial}{\partial t}[\rho_G R_G] + \frac{\partial}{\partial x}[\rho_G R_G U_G] = m \tag{1}$$

$$\frac{\partial}{\partial t}[\rho_L R_L] + \frac{\partial}{\partial x}[\rho_L R_L U_L] = -m \tag{2}$$

$$\frac{\partial}{\partial t}[\rho_L R_L U_L + \rho_G R_G U_G] + \frac{\partial}{\partial x}[\rho_L R_L U_L^2 + \rho_G R_G U_G^2 + P + M_c] = \tag{3}$$

$$T^w - (\rho_G R_G + \rho_L R_L)g \cdot \sin\theta$$

$$\frac{\partial}{\partial t}\left[\rho_L R_L \left(H_L + \frac{U_L^2}{2}\right) + \rho_G R_G \left(H_G + \frac{U_G^2}{2}\right) - P + \frac{M_c}{2}\right] + \tag{4}$$

$$\frac{\partial}{\partial x}\left[\rho_L R_L U_L \left(H_L + \frac{U_L^2}{2}\right) + \rho_G R_G U_G \left(H_G + \frac{U_G^2}{2}\right) + E_c\right] =$$

$$-Q^w - (\rho_G R_G U_G + \rho_L R_L U_L)g \cdot \sin\theta$$

$$\text{with } M_c = \beta(1-\beta)\sum_{k=L,G}\left(\frac{\rho_k^S R_k^S \rho_k^D R_k^D}{\rho_k R_k}(U_k^S - U_k^D)^2\right)$$

and $$E_c = \beta(1-\beta)\sum_{k=L,G}\left(\frac{\rho_k^S R_k^S \rho_k^D R_k^D}{\rho_k R_k}(U_k^S - U_k^D)\right.$$

$$\left.\left(H_k^S - H_k^D + \frac{(U_k^S - U_k^D)(U_k + U_k^S + U_k^D)}{2}\right)\right)$$

Subscript k stands for the phase (G for the gas phase and L for the liquid phase), the superscripts S, D for the two basic regimes (Separated flow and Dispersed flow). r, R, U and H are the density, the volume fraction, the velocity and the enthalpy respectively. q is the inclination angle with respect to horizontal. $T^w$ and $Q^w$ are the contributions of the wall friction and heat transfer across the wall. $\beta$ is a factor representing the fraction of a flow in a separated state. It ranges from 0 for the flows totally in a dispersed state to 1 for the flows totally in the separated state.

Five main variables are unknown:

$R_G$ the gas volume fraction,

P the pressure,

T the temperature, $U_G$ the gas velocity, $U_L$ the liquid velocity.

Thus, an additional equation is required to close this system of 4 partial differential equations:

$$\text{Hydro}[U_G, U_L, R_G, P, T] = 0 \tag{5}$$

Equation (5) reduces to a slip equation in the case of dispersed flow. It is a macroscopic momentum balance in the case of a stratified flow and a set of algebraic equations in the case of a intermittent flow. Thus, it is flow regime dependent, and as explained later special treatment is used to avoid any discontinuities when flow regime transitions occur.

In addition, two complementary terms $M_c$ and $E_c$ appear in the momentum and energy equations. These terms vanish for dispersed flow ($\beta=0$), and for separated flow ($\beta=1$); in intermittent flow, they account for the non homogeneous distribution of a void (or gas) and velocities in the separated and dispersed parts. They are expressed versus the secondary variables $U_k^S$, $U_k^D$, $R_k^D$ and $\beta$. Moreover, the wall friction and heat fluxes may be written:

$$T^w = \beta T^{wS} + (1-\beta)T^{wD} \tag{6}$$

$$Q^w = \beta Q^{wS} + (1-\beta)Q^{wD} \tag{7}$$

in which the contributions of separated and dispersed parts appear.

A unified formulation is used for the gas and liquid wall friction and the interfacial friction and thereby the form of these closure relations is independent of the flow regime and has the same structure as a single phase flow relationship. Furthermore, it will be shown that it is possible to obtain continuous solutions of the hydrodynamic model across flow regime transitions, even though the analytical form of the hydrodynamic model for the two basic regimes is very different.

Hereafter are discussed the closure relations and the constraints which are added to provide continuity at the boundaries between the general case ($0<\beta<1$) corresponding to intermittency, and the two degenerated cases $\beta=0$ (dispersed flow) and $\beta=1$ (separated flow).

Dispersed flow ($\beta=0$)

The closure equation (5) reduces to a drift flux relation expressing the gas velocity versus the mixture velocity $U^D$ and the bubble drift velocity $V_B$.

$$U_G^D = C_0 U^D + V_B(d_B, R_G^D, \theta) \tag{8}$$

Figure 2:
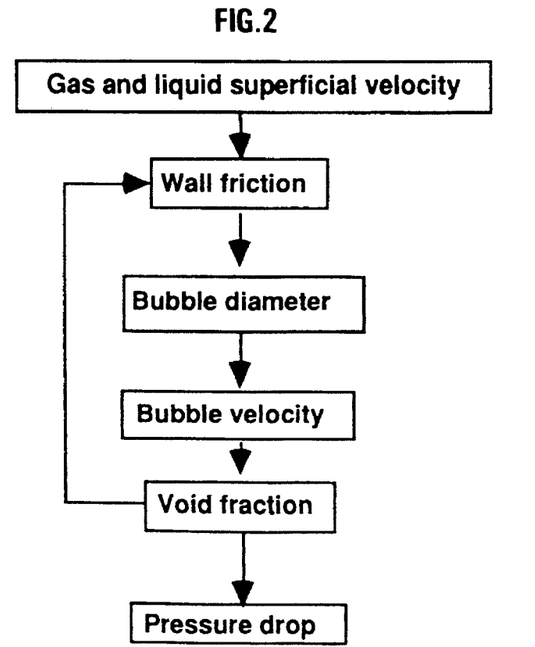
FIG. 2 shows an algorithm used for resolution of dispersed flow.

The resolution algorithm for the dispersed flow regime is given in FIG. 2.

Separated flow ($\beta=1$)

For separated flow, Eq. (5) is a combination of the gas and liquid momentum equations from which the pressure gradient has been eliminated:

$$\frac{T_L^{wS}}{R_L^S} - \left(\frac{1}{R_L^S} + \frac{1}{R_G^S}\right)T^i - \frac{T_G^{wS}}{R_G^S} - (\rho_L - \rho_G)g\sin\theta = 0 \tag{9}$$

Figure 3:
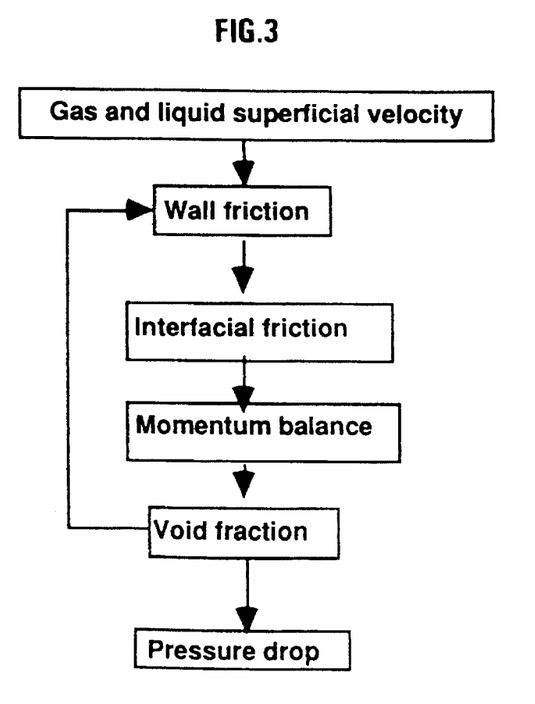
FIG. 3 shows an algorithm used for resolution of separated flow.

FIG. 3 shows the algorithm for obtaining a iterative solution for equation (10) from expressions of the wall and interfacial friction, $T_L^{wS}$, $T_G^{wS}$, $T^i$.

Intermittent flow ($0<\beta<1$)

In intermittent flowing, we have a periodic structure of dispersed and separated flows.

The solution of the model depends on an accurate prediction of the slug velocity. So, we have chosen to express the slug velocity by the relation:

$$V = C_0(Re, Bo, Fr, \theta)U^D + C_\infty(Re, Bo, Fr, \theta)\sqrt{\frac{\Delta\rho}{\rho_L}gD} \tag{10}$$

where the coefficients $C_0$ and $C_\infty$ are a function of the inclination angle, the Bond number Bo, Reynolds number Re and Froude number Fr defined respectively as:

$$Bo = \frac{\Delta\rho g D^2}{\sigma}, Re = \frac{|U^D|D}{\nu_L}, Fr = \frac{|U^D|}{\sqrt{(\Delta\rho/\rho_L)gD}} \tag{11}$$

Figure 4:
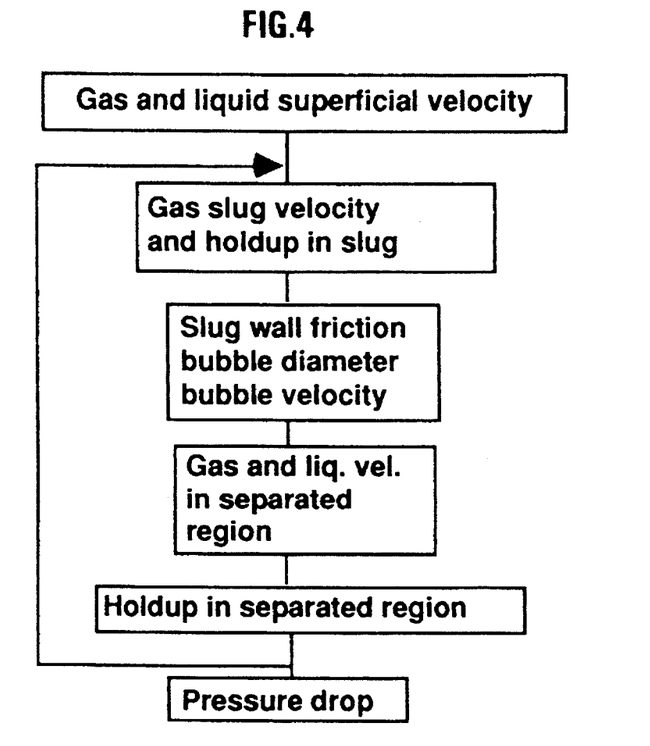
FIG. 4 shows algorithm used for resolution of intermittent flow.

The solution algorithm for intermittent flow is given in FIG. 4.

Flow regime transitions

The algorithms as shown on FIGS. 2–4 correspond to a calculation with imposed flow regime. Hereafter we show how transition criteria lead to discontinuities in the calculated variables, why this is incompatible with the averaged nature of the equations of motion, and how the transition rules of the method according to the invention have been selected to avoid such discontinuities.

Figure 5:
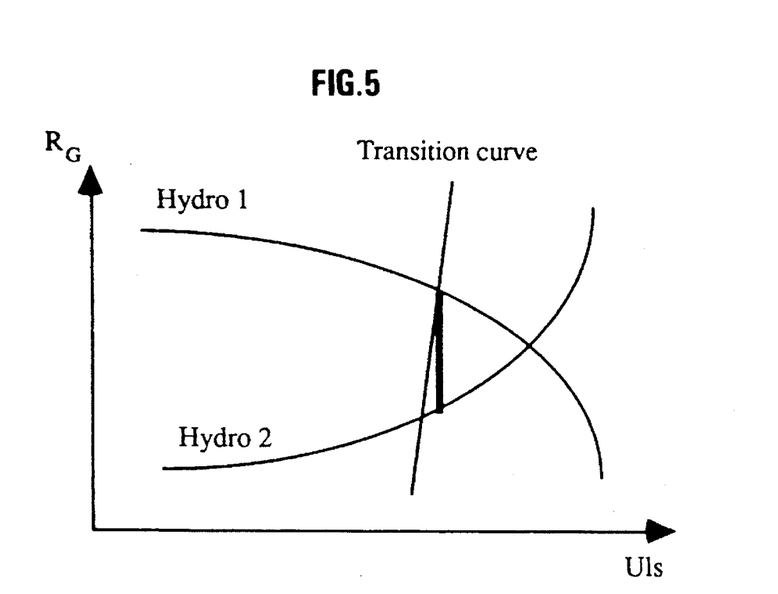
FIG. 5 schematically shows a flow regime transition.
Figure 6:
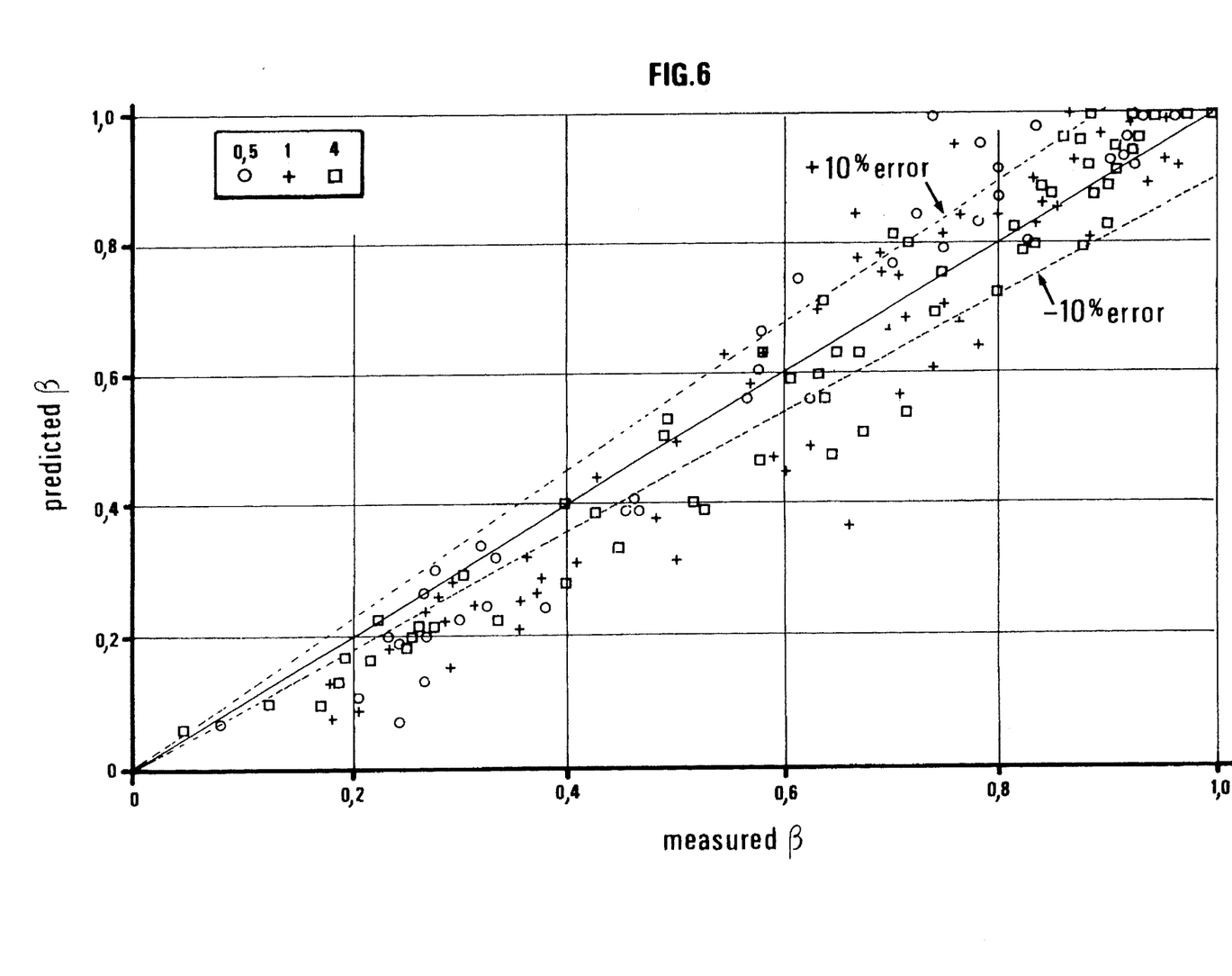
FIG. 6 shows a prediction of the configuration density $\beta$ on experimental data obtained by circulating hydrocarbons in a test loop.

A standard approach to determine flow regimes is to apply a set of transition criteria. However, if the criteria are not closely coupled with the models for the individual flow regimes, they lead to discontinuities in the calculated variables. This is best illustrated in FIG. 5 where the hydrodynamic models (Hydro 1 and Hydro 2) for flow regimes 1 and 2 are represented. This graph schematically represents the dependence of one of the variables (e.g. the gas volume fraction $R_G$) as a function of the other dependent variables (e.g. the superficial liquid velocity $U_{LS}$). FIG. 5 then shows that unless the transition criterion crosses the intersection between the two hydrodynamic models, a discontinuity in one of the dependent variables will occur at the transition.

The averaged equations of motion are based on the assumption that the length scale of the flow is small with respect to the length of the control volume over which the equations are averaged. Similarly, the flow regime must be understood as an averaged property of the flow structure in the control volume. Thus, even if locally, the void fraction and slip velocity between phases may present a discontinuous behaviour, these variables cannot be discontinuous in an averaged sense.

Proposed treatment of flow regime transitions

The method according to the invention then provides special treatment of flow discontinuities. The constraint that the calculated variables be continuous across the transitions, implies that the hydrodynamic models representing the different flow regimes, though very different in form, should lead to continuous solutions across transition boundaries. To obtain this, the following rules are implemented:

The intermittent flow regime is considered as the basic flow regime. The parameter $\beta$:

$$\beta = \frac{R_G - R_G^B}{R_G^P - R_G^B} = \frac{R_G U_G - R_G^B U_G^B}{R_G^P U_G^P - R_G^B U_G^B} \qquad (12)$$

ranges from 0 to 1, and is a result of the calculation.

In relation 12:

$R_G$ is the gas volume fraction;

$R_G U_G$, the gas superficial velocity; and superscript P and B refer respectively to the separated and dispersed regions.

When $\beta=0$, ($R_G^B=R_G$) the hydrodynamic model H reduces to the dispersed flow model, that is a slip equation in the liquid slug. The transition between dispersed and intermittent flow occurs when the void fraction in the liquid slug is equal to the void fraction of pure dispersed flow.

When $\beta=1$, ($R_G^P=R_G$) the hydrodynamic model reduces to the stratified flow model, i.e a momentum balance in the separated region.

It must be insured however that:

no solution can be found for $\beta$ outside of the interval [0,1], and the solution tends smoothly towards these limits.

The dispersed/intermittent boundary ($\beta=0$) is dealt with by imposing the constraint $R_G^B \leq R_G$ to the constitutive relation for the holdup in the slug. Furthermore a smooth transition is guaranteed by having the slug velocity tend continuously towards $U_G^B$ i.e. the gas velocity in the slug as $R_G^B \to R_G$:

For the stratified/intermittent boundary the following general relations are used:

$$V_P = \frac{U_G R_G - U_G^B R_G^B}{R_G - R_G^B} = \frac{U_G R_G - U_G^P R_G^P}{R_G - R_G^P} \qquad (14)$$

In intermittent flow, the gas bubbles in slugs coalesce with the front of the gas pocket, and bubbles are released at the gas pocket tail into the following liquid slug. Thus:

$V_P \geq U_G$.

Let us consider now the limiting case when the intermittent configuration tends towards the separated configuration. We have $R_G \leq R_G^P$ and $R_G \to R_G^P \to R_G^S$. It turns out that the limiting value of the slug velocity when $\beta \to 1$ is $U_G$: By combining (12) and (14), we obtain:

$$V_P = \frac{R_G U_G - R_G^P U_G^P}{(1-\beta)(R_G^B - R_G^P)} \qquad (15)$$

and as $\beta \to 1$, $U_G^P \to U_G$, and $V_P \to U_G$.

Figure 7A:
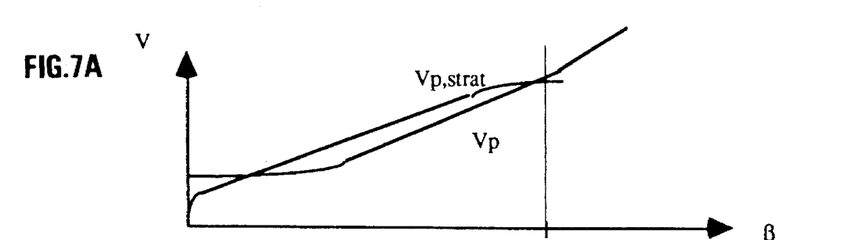
FIGS. 7A and 7B schematically shows variations of gas slug velocity and slip respectively for different flow regimes.

Though in principle this result is true, in practice, the slug velocity is represented by a closure law or constitutive relation and $V_P > U_G$ irrespective of the value of $\beta$. To force this limit, (FIG. 7A) we put an upper bound for the slug velocity defined as:

$$V_{p,strat} = \frac{U_G R_G - U_G^B R_G^B}{R_G^S - R_G^B} \qquad (16)$$

Figure 7B:
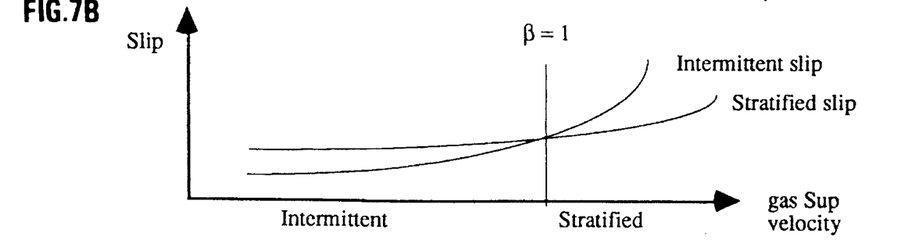

It is easy to verify that when $\beta=1$, $R_G^S = R_G^P$ and $U_G R_G = U_G^P R_G^P$, thus $V_{p,strat} = V_P = U_G$. When $\beta<1$ it is assumed that the slip in separated flow (FIG. 7B) is greater than in intermittent flow, thus $R_G^P > R_G > R_G^S$, and from relations (14) and (16), $V_P < V_{p,strat}$.

Figure 1:
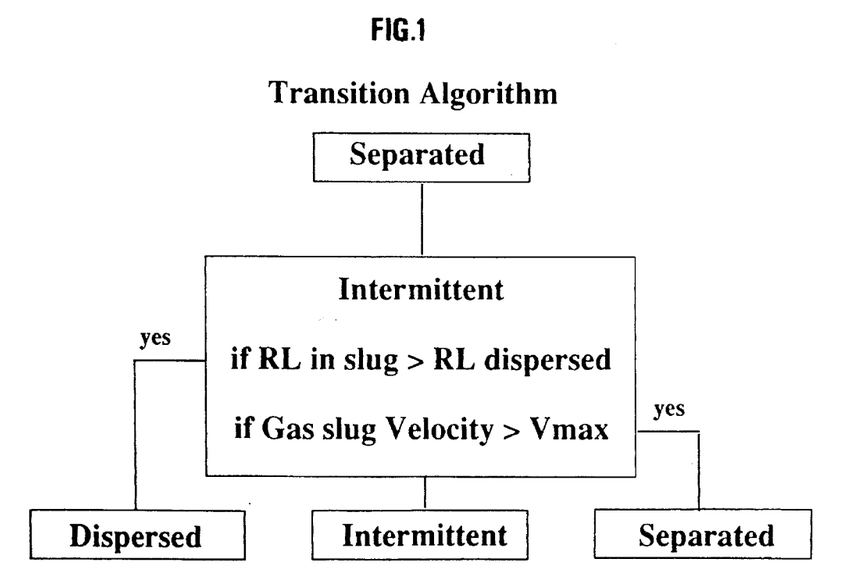
FIG. 1 shows how early tests on parameters can result in a selection of a flow regime to be determined.

It is also important to note that the determination of the actual flow regime can take place in the method of the invention at an early stage of the general algorithm. As can be seen on FIG. 1, testing may be made on the value of the liquid proportion RL in the slugs with respect to the corresponding proportion in the dispersed regime. In the same way, testing may also be made on the gas slug velocity $V_p$ with respect to Vmax. As a result the proper flow regime can be determined and only the computation of this actual flow regime is achieved.

Numerical scheme

The model requires the solution of a hyperbolic set of partial differential equations of the form given in equations (1) to (4):

$$\frac{\partial}{\partial t} W(U) + \frac{\partial}{\partial x} F(U) = Q(U) \qquad (17)$$

together with the algebraic constraint:

Hydro(U)=0 (18)

$U=T(R_G,U_G,U_L,P,T)$ is the set of dependent variables. At each time step, W is computed by a time advancing scheme, and the dependent variables are calculated with the help of the hydrodynamic model (Eq. 19). The time advancing scheme is explicit, so that the state of the system at time (n+1) is calculated on the basis of the flux term F and source terms Q evaluated at time n.

Explicit schemes are stable provided that the Courant Friedriech Levy criterion well known in the art is satisfied. In practice, this condition imposes a limitation on the time step $\Delta t$ depending on the speed of the fastest wave propagating in the system $c_{max}$:

$$\Delta t \leq \frac{\Delta x}{c_{max}} \quad (19)$$

The method according to the invention comprises use of a three point predictor corrector scheme which is an explicit time advancing scheme with a second order accuracy as described by:

Lerat, A., 1981, "Sur le calcul des solutions faibles des systèmes hyperboliques de lois de conservation à l'aide de schémas aux différences." Thesis, ONERA, France.

A time advancing scheme was chosen because of the following arguments:

It has the advantage of a clear separation between the hydrodynamic calculation module, namely the function Hydro H and the treatment of the numerical scheme. This allows an independent evolution of the physical model and the numerical scheme. Thus such explicit scheme is easy to implement.

For transient simulation of complex networks, it allows for the solution of individual network components sequentially instead of requiring their simultaneous solution. Thus, the selected scheme gives more flexibility for the treatment of complex transient networks.

A good accuracy for the description of transients is needed in order to predict precisely the volume of liquid slugs travelling in the pipeline system and reaching the pipeline outlet. The numerical scheme gives second order accuracy in time and space. It also allows good front tracking capabilities. This will be very important when estimating the size of large liquid slugs reaching the pipeline outlet.

Figure 8A:
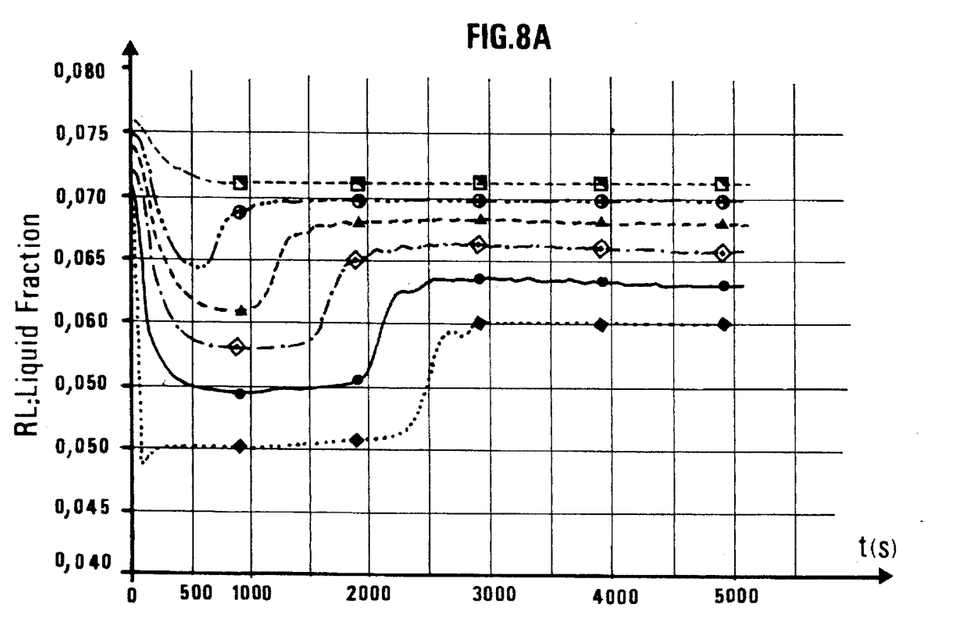
FIGS. 8A and 8B show an example of void fraction wave propagating along a pipeline.
Figure 8B:
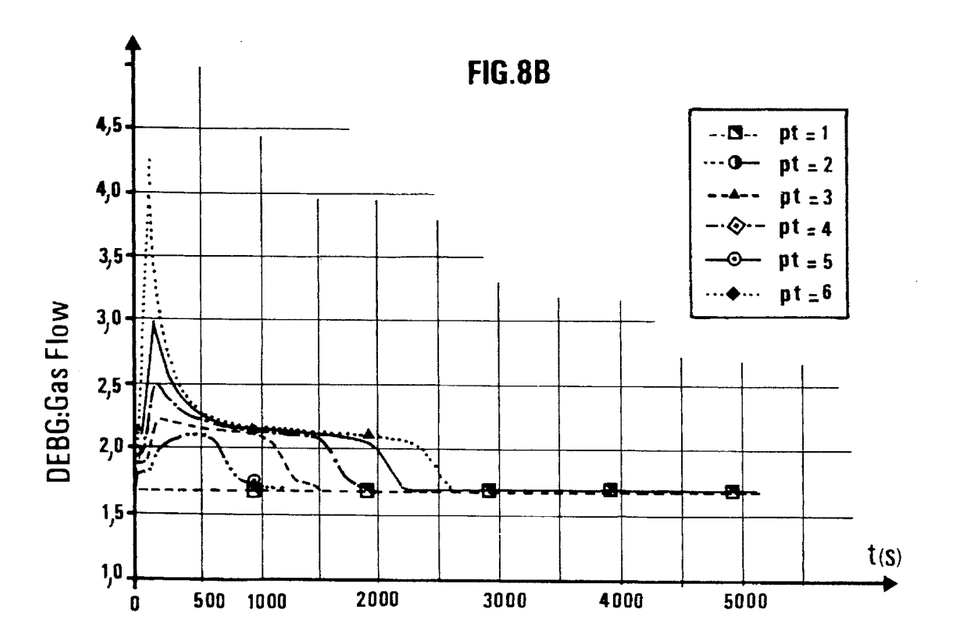

FIGS. 8A and 8B show a typical test case on of horizontal pipe 10 km long. The pressure at the outlet is decreased in 100 seconds from 10 bars to 5 bars. FIG. 7A shows that the pressure wave propagates very fast towards the inlet to generate a void fraction front which propagates to the outlet in 2500 seconds. FIGS. 8A and 8B illustrate the importance of having a numerical scheme able to track accurately wave fronts propagating in the system.

Special attention has been drawn to the treatment of boundary conditions. The hyperbolic nature of the problem makes it very important to treat precisely the transport of information through the pipe, and in particular the information going in and out of the system. Four types of waves are identified in the analytical model:

Void fraction waves travelling downstream.
Pressure waves travelling downstream.
Pressure waves travelling upstream.
Enthalpy waves travelling with the mean flow.

The applied treatment of boundary conditions takes into account the information going out of the system through a set of compatibility relations, which must be solved together with the imposed boundary conditions. Thus, it depends on the direction of propagation of the different wave systems. Under such conditions, the solution of the following set of equations gives a rigorous treatment of the boundary conditions:

At the inlet:
Mass flowrate of gas
Mass flowrate of liquid
Temperature
Compatibility condition for pressure waves travelling upstream
Hydrodynamic function At the outlet:
Pressure
Compatibility condition for enthalpy propagation
Compatibility condition for pressure waves travelling downstream
Compatibility condition for void fraction waves
Hydrodynamic function Validation of the hydrodynamic function The hydrodynamic module of the method according to the invention has been validated extensively and notably on experimental data available from measurements on a test pipe loop. The data cover a wide range of inclinations (−3°, −0.5°, 0°, 1°, 4°, 15°, 45°, 75° and 90°) with 3" and 6" piping. diesel oil and condensate have been used alternatively together with natural gas as working fluids. The fluid properties, which were measured in the laboratory pressures up to 5 MPa, were investigated over a wide range of flowrates. the horizontal and slightly inclined data bank contains about 1750 points of which 900 are in stratified flow, 600 are in slug flow, and 250 are in dispersed flow. The data bank on vertical and highly inclined flow consists of about 700 measurement points (260 for bubbly flow, 400 for slug flow and 40 for annular flow). FIGS. 8A and 8B for example show comparisons of the model predictions for inclinations of 15°, 45°, 75° and 90° of the pipes.

The hydrodynamic function has also been tested successfully on a number of operating North Sea fields

We claim:

1. A method for modeling steady state and transient flow of multiphase fluids, such as hydrocarbon mixtures circulating in pipelines, defined by a set of variables defining fluid properties and flow patterns and dimensions or slope angles of the pipelines, by numerical resolution of a drift-flux type model, comprising:

solving a set of transport equations including mass conversion equations for each phase, a mixture momentum equation and a mixture energy equation, and flow-regime dependent closure relations suitable for dispersed flow regimes, a separated flow regime and any intermittent flow regime with formation of liquid or gas slugs;

imposing when solving the closure relations continuity constraints at boundaries between the regimes to the gas volume fractions and to slug velocities;

determining any current flow regime when solving the set of closure relations by comparing current values of a liquid fraction in slugs with respect to a liquid fraction in a dispersed region of the flow, as well as a gas slug velocity with respect to a gas slug velocity for the separated flow regime; and characterizing flow regimes by a parameter $\beta$ representing the fraction of a flow in a separated state, the parameter $\beta$ continuously ranging from 0 for dispersed flow regimes to 1 for separated flow regimes.

2. A method according to claim 1 comprising:

imposing an upper limit for the gas volume fraction in the dispersed region of the flow, and imposing the slug velocity to continuously tend toward the gas velocity of the slugs as the gas volume fraction reaches the upper limit, thereby smoothing a transition between the dispersed flow regime and the intermittent flow regime.

3. A method according to claim 1 comprising:

an upper bounding the gas slug velocity by the gas velocity for the separated flow regime defines as $$V_{p,strat} = \frac{U_G R_G - U_G^B R_G^B}{R_G^S - R_G^B} \text{ where}$$

$R_G$ is the gas volume fraction $R_G U_G$ the gas superficial velocity,

UGBRGB, the gas superficial velocity in a dispersed region of an intermittent flow, RGB and RGS respectively, the gas volume fraction in the dispersed and in a separated region of the intermittent flow.

4. A method according to claim 2 comprising:

an upper bounding the gas slug velocity by the gas velocity for the separated flow regime defines as $$V_{p,strat} = \frac{U_G R_G - U_G^B R_G^B}{R_G^S - R_G^B} \text{ where}$$

$R_G$ is the gas volume fraction $R_G U_G$ the gas superficial velocity,

UGBRGB, the gas superficial velocity in a dispersed region of an intermittent flow, RGB and RGS respectively, the gas volume fraction in the dispersed and in a separated region of the intermittent flow.

5. A method according to claim 1, comprising:

selecting an explicit time advancing scheme to solve the transport equations.

6. A method according to claim 2, comprising:

selecting an explicit time advancing scheme to solve the transport equations.

7. A method according to claim 3, comprising:

selecting an explicit time advancing scheme to solve the transport equations.

8. A method according to claim 4, comprising:

selecting an explicit time advancing scheme to solve the transport equations.

\* \* \* \* \*